United States Patent [19]

Ishikura et al.

[11] Patent Number: 5,191,277

[45] Date of Patent: Mar. 2, 1993

[54] ELECTRONIC APPARATUS CAPABLE OF CONTROLLING ELECTRIC CURRENT SUPPLY

[75] Inventors: Akira Ishikura, Tokyo; Takaaki Ishii, Sagamihara, both of Japan

[73] Assignee: Kabushiki Kaisha Toshiba, Kawasaki, Japan

[21] Appl. No.: 584,828

[22] Filed: Sep. 19, 1990

[30] Foreign Application Priority Data

Sep. 20, 1989 [JP] Japan ................................. 1-245971

[51] Int. Cl.$^5$ ..................... H02J 7/00; H01M 10/46
[52] U.S. Cl. ..................................... 320/22; 320/2; 455/89
[58] Field of Search .................. 320/2, 13, 22-24; 455/89

[56] References Cited

U.S. PATENT DOCUMENTS 4,673,861 6/1987 Dubovsky et al. ..................... 320/2
4,684,870 8/1987 George et al. ........................ 320/2 X
4,734,635 3/1988 Theobald .............................. 320/13

Primary Examiner—R. J. Hickey
Attorney, Agent, or Firm—Finnegan, Henderson, Farabow, Garrett and Dunner

[57] ABSTRACT

An electronic apparatus comprising a charger and an electronic device connected removably to the charger. The electronic device comprises a rechargeable battery unit charged by the charger when the charger is connected to the electronic device, an electronic unit having a plurality of operational modes in each of which a different operating current is required, a charger connection detector for detecting the connection of the charger to the electronic device, and a first control unit for calculating an appropriate current to be supplied from the charger, on the basis of an appropriate operating current value corresponding to the operational mode of the electronic unit and a specified charging current value for the battery unit, and informing the charger of the appropriate supplying current value when the charger connection detector detects that the charger is connected to the electronic device. The charger comprises a current supplying circuit for supplying the electric current to the electronic device, and a second control unit for controlling the current to be supplied by the current supplying circuit such that the controlled current coincides with the appropriate supplying current when the first control unit informs the charger of the appropriate supplying current value.

3 Claims, 5 Drawing Sheets

| OPERATIONAL MODE | APPROPRIATE OPERATING CURRENT VALUE |
|---|---|
| $m_1$ | $I_1$ |
| $m_2$ | $I_2$ |
| ⋮ | ⋮ |
| $m_i$ | $I_i$ |
| ⋮ | ⋮ |

# ELECTRONIC APPARATUS CAPABLE OF CONTROLLING ELECTRIC CURRENT SUPPLY

BACKGROUND OF THE INVENTION

1. Field of the Invention

The present invention relates to an electronic apparatus such as a portable radio device, and more particularly to an electronic apparatus which appropriately controls the current supplied by a current supply unit in accordance with the operational modes of the apparatus.

2. Description of the Related Art

A portable electronic apparatus such as a portable radio device is mounted with a rechargeable battery to be used as a power source when the apparatus is in portable use. To charge the battery, a charger is connected to the portable apparatus.

In the portable electronic apparatus of this type, such as a portable radio device, the operating current varies according to the operational modes, that is, whether a radio unit in the portable radio device is in a transmission mode or a standby mode. The charging current supplied by the charger, however, is kept constant irrespective of the operational modes of the portable radio device.

Therefore, when the portable radio device is operated while it is connected to the charger, the current flowing through the rechargeable battery varies as the operational mode of the radio device changes, whereby the rechargeable battery is likely to be deteriorated. If, for example, the operating current in an operational mode is less than a predetermined operating current for operating the radio device, the current flowing through the rechargeable battery increases so as to exceed the battery's allowable current values (specified charging current), to thereby deteriorate the battery.

On the other hand, there is an event in which the supply of the operating current to the portable radio device is insufficient in a certain operational mode of the radio device. In such event, an appropriate operation of the radio unit cannot be ensured. This takes place when the operating current in the certain operational mode is larger than the predetermined operating current of the radio device so that the radio device cannot operate appropriately.

The above discussion also applies to other electronic apparatuses having a plurality of operational modes which require different operating currents.

Conventionally, electronic apparatuses of the abovedescribed type have a trouble in operating the apparatus when the apparatuses are connected to the charger.

SUMMARY OF THE INVENTION

It is an object of the present invention to provide an electronic apparatus of a type which has a plurality of operational modes which require different operational currents, capable of being operated appropriately and capable of charging a rechargeable battery mounted in the apparatus appropriately even when the apparatus is connected to and operated by a charger.

According to the present invention, an electronic apparatus capable of controlling electric current supply, comprises a charger and an electronic device connected removably to the charger. The electronic device comprises a rechargeable battery unit charged by the charger when the charger is connected to the electric device, an electronic unit having a plurality of operational modes in each of which a different operating current is required, the operating current being supplied from the battery unit, a connection detecting circuit for detecting the connection of the charger to the electronic device, and a first control circuit for generating a control signal indicative of an appropriate supplying current value to be supplied from the charger on the basis of an appropriate operating current value for each of the operational modes of the electronic unit and a specified charging current value of the battery unit, and supplying the control signal to the charger when the connection detecting circuit detects that the charger is connected to the electronic device. The charger comprises a current supplying circuit for supplying an electric current to the electronic device, and a second control circuit for controlling the current supplying circuit such that the electric current to be supplied from the current supplying circuit to the electronic device coincides with the appropriate supplying current value when supplied with the control signal from the first control circuit.

According to the invention, the current supplied from the charger to the electronic apparatus is appropriately controlled in each operational mode when the rechargeable battery mounted in the electronic apparatus is connected to the charger to thereby ensure the appropriate operation of the apparatus and satisfactory charging of the rechargeable battery.

DETAILED DESCRIPTION OF THE PREFERRED EMBODIMENTS

An embodiment of the present invention will now be described with reference to the drawings.

Figure 1:
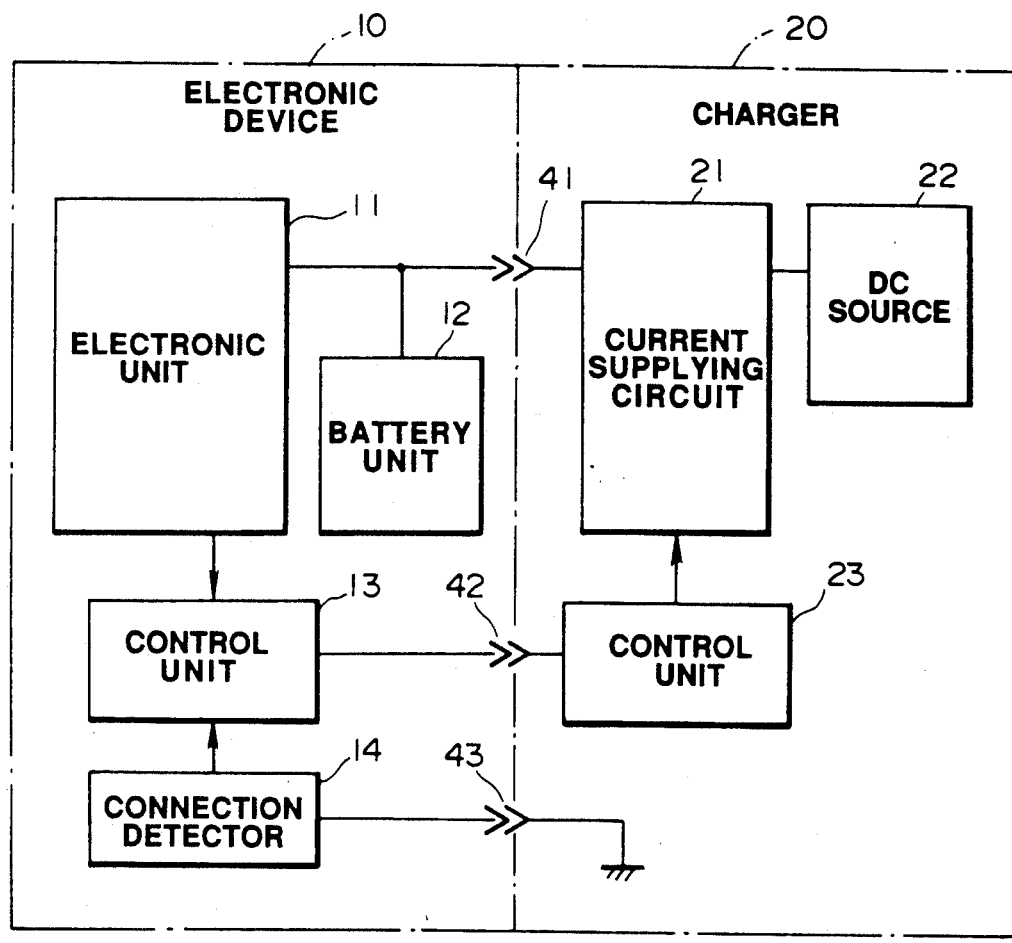
FIG. 1 is a block diagram illustrating one embodiment of an electronic apparatus according to the present invention.

FIG. 1 is a block diagram of a portable radio device for illustrating one embodiment of an electronic apparatus of the present invention. In FIG. 1, the electronic apparatus includes an electronic device 10 and a charger 20 connected removably thereto through connectors 41, 42 and 43.

The electronic device 10 includes an electronic unit 11 the operating current of which varies with each operational mode, a control unit 13 which determines the operational mode of the electronic unit 11 and informs the charger 20 of an appropriate supplying current value corresponding to that operational mode through the connector 42, a charger connection detector 14 which detects the connection of the electronic device 10 and the charger 20 through the connector 43.

The charger 20 includes a current supplying circuit 21 for controlling the current supplied to the electronic unit 10 through the connector 41, a DC current source 22 for supplying a current to the current supplying circuit 21 and a control unit 23 for controlling the current supplying circuit 21.

The operation of the embodiment will be described in detail with reference to the flowcharts of FIGS. 2 and 4.

Figure 2:
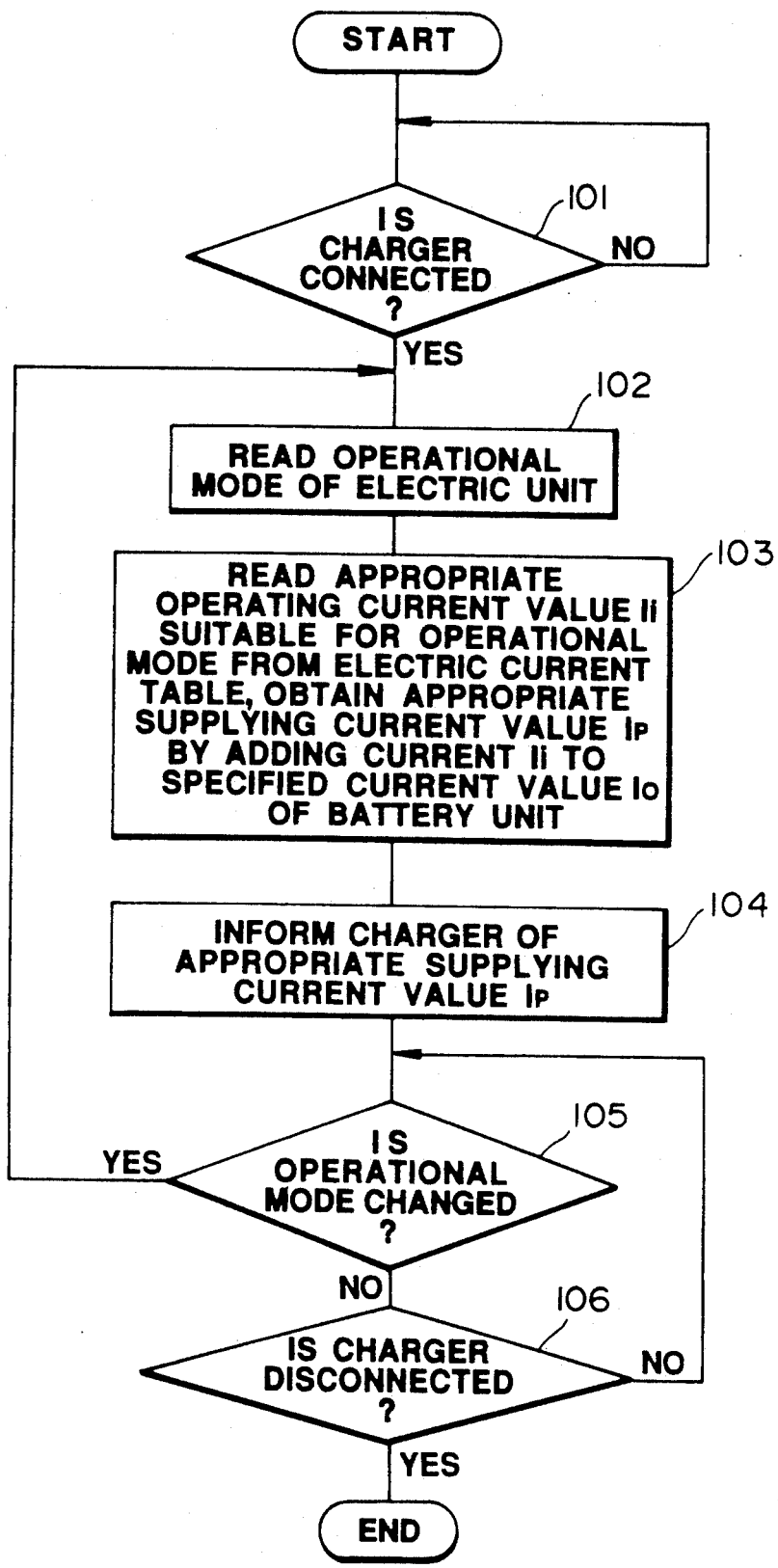
FIG. 2 is a flowchart illustrating the operational sequence of a control unit of the electronic apparatus of FIG. 1.

FIG. 2 illustrates the operation of the control unit 13 of the electronic device 10. The control unit 13 of the electronic device 10 checks whether the charger 20 is connected to the electronic device 10 in accordance with the output of the charger connection detector 14 (step 101). If so, the control unit 13 determines the operational mode of the electronic unit 11 and stores data on the operational mode (step 102).

Subsequently, the control unit 13 retrieves an electric current table shown in FIG. 3 in accordance with that operational mode and reads an appropriate operating current value Ii corresponding to that operational mode. By adding this appropriate operating current value Ii to a specified charging current value Io of the battery unit 12, an appropriate supplying current value Ip of a current supplied from the charger 20 (step 103) may be obtained.

The control unit 13 then informs the control unit 23 of the charger 20 of the appropriate supplying current value Ip through the connector 42 (step 104). Proper current values corresponding to the operational modes of the electronic unit 11 are registered beforehand on the current table of FIG. 3.

Subsequently, the control unit 13 of the electronic device 10 monitors the operational mode of the electronic unit 11 (step 105). If the operational mode of the electronic unit 11 changes, the control unit 13 returns to step 102 to determine the operational mode of the electronic unit 11 and stores the result (step 102), retrieves the current table of FIG. 3 corresponding to the operational mode, reads an appropriate operating current value Ii corresponding to that operational mode, adds the appropriate operating current value Ii to the specified charging current value Io for the battery unit 12 to obtain an appropriate supplying current value Ip of a current supplied from the charger (step 103), and informs the control unit 23 of the charger 20 of the appropriate supplying current value Ip through the connector 42 (step 104).

If the operational mode of the electronic unit 11 is determined as being unchanged at step 105, the control unit 13 determines whether the charger 20 is disconnected from the electronic device 10 on the basis of the output of the charger connection detector 14 (step 106). If not, the control unit 13 returns to the step 105. If the charger 20 is disconnected from the electronic device 10, this processing ends.

Figures 3, 4:
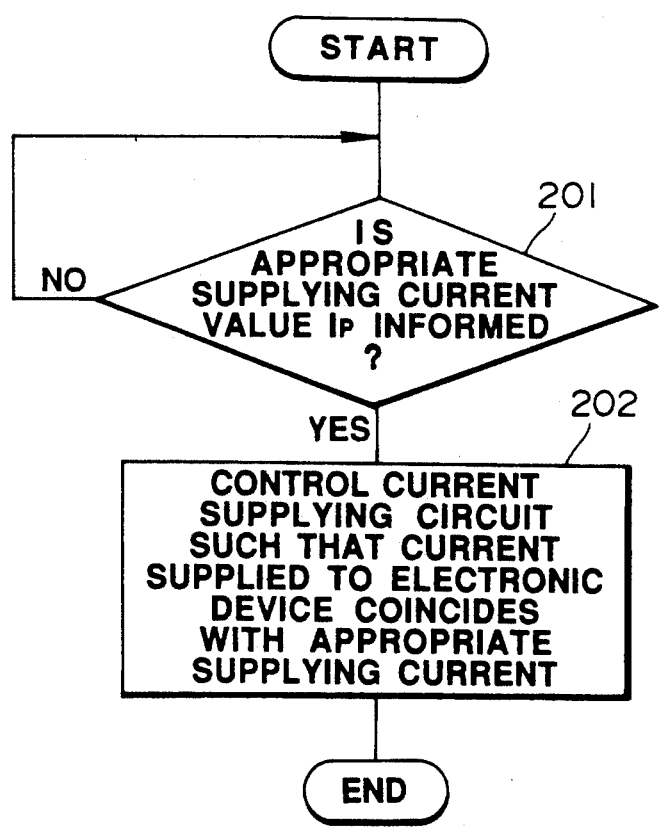
FIG. 3 is an illustration of an electronic current table which stores the correspondence between operational modes and appropriate operating current values of the electronic apparatus of FIG. 1.
FIG. 4 is a flowchart illustrating the operational sequence of a control unit of a charger shown in FIG. 1.

FIG. 4 illustrates the operation of the control unit 23 of the charger 20. The control unit 23 of the charger 20 monitors the appropriate supplying current value Ip of which the control unit 13 of the electronic device 10 informs (step 201). If the control unit 23 is informed of the appropriate supplying current value Ip, it controls the current supplying circuit 21 such that the current supplied to the battery unit 12 and the electronic unit 11 of the electronic device 10 through the connector 41 coincides with the appropriate supplying current value Ip (step 202). The processing shown in FIG. 4 is carried out at predetermined intervals of time.

In this manner, the current supplied from the charger 20 to the electronic device 10 through the connector 41 is controlled so as to be an appropriate value corresponding to the operational mode of the electronic unit 11.

Figures 5, 7:
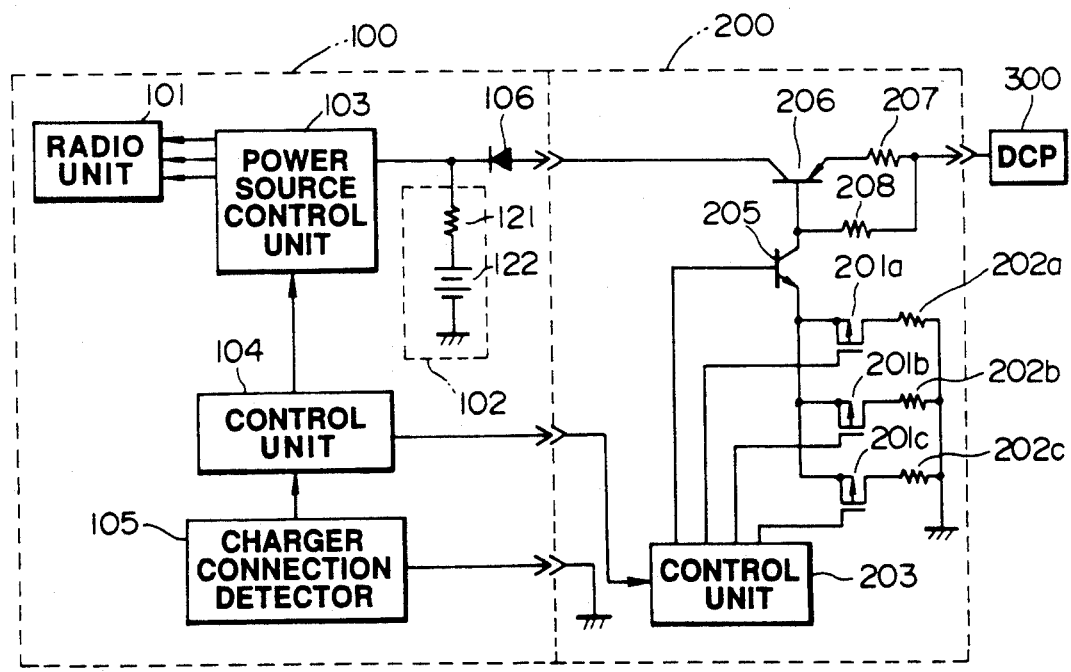
FIG. 5 is an illustration of an appropriate supplied current table which stores the correspondence between operational modes and appropriate supplying current values of the electronic apparatus of FIG. 1.
FIG. 7 is a diagram illustrating an example of the electronic apparatus according to the present invention.
Figure 6:
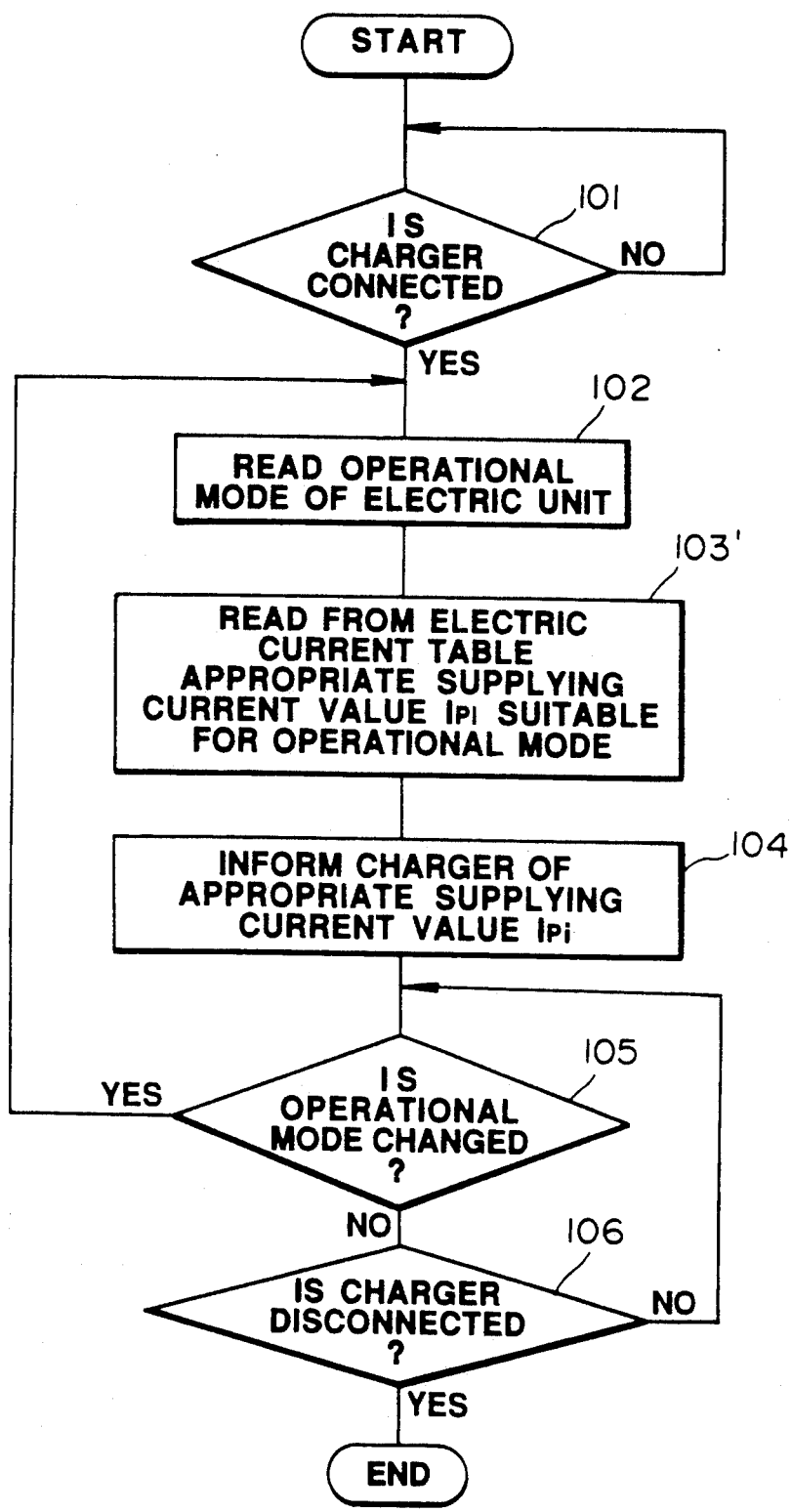
FIG. 6 is a flowchart illustrating the operational sequence of the control unit of the electronic apparatus of FIG. 1 performed when the appropriate supplied current table of FIG. 5 is employed.

Although in the embodiment the electric current table shown in FIG. 3 which beforehand stores appropriate operating current values corresponding to the respective operational modes of the electronic unit 11 is used, an appropriate supplied current table shown in FIG. 5, which stores appropriate supplying current values Ipi supplied by the charger 20 in correspondence to the respective operational modes of the electronic unit 11 may be used in place of the electric current table of FIG. 3. In this case, the sum of an appropriate operating current value Ii of the electric current table of FIG. 3 and a standard charging current value Io in the battery unit 12 is stored in the column of an appropriate supplying current value Ipi of the appropriate supplied current table of FIG. 5 and thus the flowchart of FIG. 2 is modified as shown in FIG. 6. FIG. 6 differs from FIG. 2 only in the step 103' thereof wherein the step 103 of FIG. 2 is changed such that an appropriate supplying current value Ipi suitable for the operational mode is read from the appropriate supplied current table of FIG. 5.

FIG. 7 illustrates an example of a portable radio apparatus to which the present invention is applied.

In FIG. 7, the numeral 100 denotes a radio device as an electronic device; 200, a charger; and 300, a DC power source.

The radio device 100 includes a radio unit 101 which performs predetermined transmitting and receiving operations; a rechargeable battery unit 102 which supplies an operating current to the radio unit 101, a power source control unit 103 which controls the current from the battery unit 102 in accordance with the operational mode of the radio unit 101, a control unit 104 which stores an operating current value corresponding to each of the operational modes of the radio unit 101 (see the electric current table of FIG. 3) and controls the source control unit 103 in accordance with the operational mode of the radio unit 101, and a charger connection detector 105 which detects the connection of the radio device 100 and the charger 200. The rechargeable battery unit 102 includes a resistor 121, a rechargeable battery 122 and a rectifying diode 106 for connecting the rechargeable battery unit 102 to the charger 200.

The charger 200 includes MOS FETs 201a-201c and resistors 202a-202c for obtaining an operating current in each of the operating modes of the radio unit 101, and the charging current for charging the rechargeable battery 122, or the charging current for charging the battery 122; a charger side control unit 203 for controlling combined on-states of MOS FETs 201a-201c in accordance with a control command signal from the control unit 104 of the radio device 100; transistors 205 and 206, the turning on/off of which is controlled by the charger side control unit 203; and resistors 207, 208 provided between the transistors 205, 206 and a DC current supply unit 300.

If the charger 200 is connected to the radio device 100 when the radio unit 101 is in an inoperative state in the portable radio apparatus so arranged, the control unit 104 issues to the charger side control unit 203 a command signal designating the value of a charging current for charging the rechargeable battery 122 of the rechargeable battery unit 102. Thus, a predetermined on-state combination of the MOS FETs 201a-201c is selected to provide an appropriate charging current and the conduction of the transistor 206 is controlled. Therefore, a current suitable for charging the rechargeable battery 122 is supplied by the DC current supply unit 300.

If the radio unit 101 is operated under such conditions, the operational mode of the radio unit 101 is detected by the control unit 104, which thus outputs to the charger side control unit 203 a signal designating the operating current value necessary for the operation in that mode and the value of the charging current for charging the battery 122. Thus, a predetermined on-state combination of MOS FETs 201a-201c obtaining the operating current and charging current necessary for the current operational mode of the radio unit 101 is selected by the control unit 203, transistor 205 is turned on and the conduction of the transistor 206 is controlled. Therefore, under such conditions, the operating current required for the current operational mode of the radio unit 101 and the current required for charging the battery 122 are supplied by the DC current supply unit 300.

Therefore, in the present embodiment, control is provided such that the operating current required for the current operational mode of the radio unit 101 and the electric current required for charging the battery are supplied, so that the appropriate operation of the apparatus is ensured and satisfactory charging of the battery is achieved.

While in the present embodiment a portable radio apparatus has been described as an example, the present invention is applicable to other electronic apparatus which include a rechargeable battery and operate in a plurality of operational modes.

What is claimed is:

1. An electronic apparatus capable of controlling electric current supply, comprising:
   a charger; and
   an electronic device removably connected to the charger,
   the electronic device comprising:
   a rechargeable battery unit charged by the charger when the charger is connected to the electronic device;
   an electronic unit having a plurality of operational modes in each of which the electronic unit is operated by an operating current of different values, the operating current being supplied from the rechargeable battery unit;
   connection detecting means for detecting the connection of the charger to the electronic device; and
   first control means for generating a control signal indicative of an appropriate supplying current value to be supplied from the charger on the basis of an appropriate operating current value for each of the operational modes of the electronic unit and a specified charging current value of the battery unit, and supplying the control signal to the charger when the connection detecting means detects that the charger is connected to the electronic device, wherein the first control means comprises an electric current table for storing the appropriate operating current value corresponding to each of the operational modes of the electronic unit;
   means for detecting a present operational mode of the electronic unit;
   means for retrieving an appropriate operating current value corresponding to the present operational mode from the electric current table on the basis of the present operational mode;
   means for calculating the appropriate operating current value to be supplied by the charger by adding the appropriate operating current value retrieved by the retrieving means and the specified charging current of the rechargeable battery unit; and
   means for informing the charger of the appropriate supplying current value calculated by the calculating means when the connection detecting means detects that the charger is connected to the electronic device,
   the charger comprising:
   current supply means for supplying an electric current to the electronic device; and
   second control means for controlling the current supply means such that the electric current to be supplied from the current supply means to the electronic device coincides with the appropriate supplying current value when supplied with the control signal from the first control means.

2. An electronic apparatus capable of controlling electric current supply, comprising:
   a charger; and
   an electronic device removably connected to the charger,
   the electronic device comprising:
   a rechargeable battery unit charged by the charger when the charger is connected to the electronic device;
   an electronic unit having a plurality of operational modes in each of which the electronic unit is operated by an operating current of different values, the operating current being supplied from the rechargeable battery unit;
   connection detecting means for detecting the connection of the charger to the electronic device; and
   first control means for generating a control signal indicative of an appropriate supplying current value to be supplied from the charger on the basis of an appropriate operating current value for each of the operational modes of the electronic unit and a specified charging current value of the battery unit, and supplying the control signal to the charger when the connection detecting means detects that the charger is connected to the electronic device, wherein the first control means comprises
   an electric current table for storing the appropriate operating current value corresponding to each of the operational modes of the electronic unit;
   means for detecting a present operational mode of the electronic unit;
   means for retrieving an appropriate supplying current value corresponding to the present operational mode from the electric current table on the basis of the present operational mode; and
   means for informing the charger of the appropriate supplying current value retrieved by the retrieving means,
   the charger comprising:

current supply means for supplying an electric current to the electronic device; and second control means for controlling the current supply means such that the electric current to be supplied from the current supply means to the electronic device coincides with the appropriate supplying current value when supplied with the control signal from the first control means.

3. An electronic apparatus capable of controlling electric current supply, comprising:
 a charger; and
 an electronic device removably connected to the charger,
 the electronic device comprising:
 a rechargeable battery unit charged by the charger when the charger is connected to the electronic device;
 an electronic unit having a plurality of operational modes in each of which the electronic unit is operated by an operating current of different values, the operating current being supplied from the rechargeable battery unit;
 connection detecting means for detecting the connection of the charger to the electronic device; and
 first control means for generating a control signal indicative of an appropriate supplying current value to be supplied from the charger on the basis of an appropriate operating current value for each of the operational modes of the electronic unit and a specified charging current value of the battery unit, and supplying the control signal to the charger when the connection detecting means detects that the charger is connected to the electronic device,
 the charger comprising:
 current supply means for supplying an electric current to the electronic device, comprising
  a PNP transistor having an emitter connected through a first resistor to a DC power source, a base connected through a second resistor to the DC power source, and a collector connected to the rechargeable battery unit mounted in the electronic device;
  an NPN transistor having a collector connected to the base of the PNP transistor; and
  a plurality of P-channel MOS field effect transistors each having a source connected to the emitter of the NPN transistor and a drain grounded through a resistor of different resistance; and
 second control means for controlling the current supply means such that the electric current to be supplied from the current supply means to the electronic device coincides with the appropriate supplying current value when supplied with the control signal from the first control means, wherein the second control means supplies a first driving current to the base of the NPN transistor and a second drive current selectively to the gates of the plurality of the P-channel MOS field effect transistors in correspondence to the appropriate supplying current to thereby selectively turn on one or more of the plurality of the P-channel MOS field effect transistors.

* * * * *